Dec. 25, 1962 — J. R. GOMERSALL — 3,070,678
THERMAL TIMER
Filed July 24, 1959 — 2 Sheets-Sheet 2

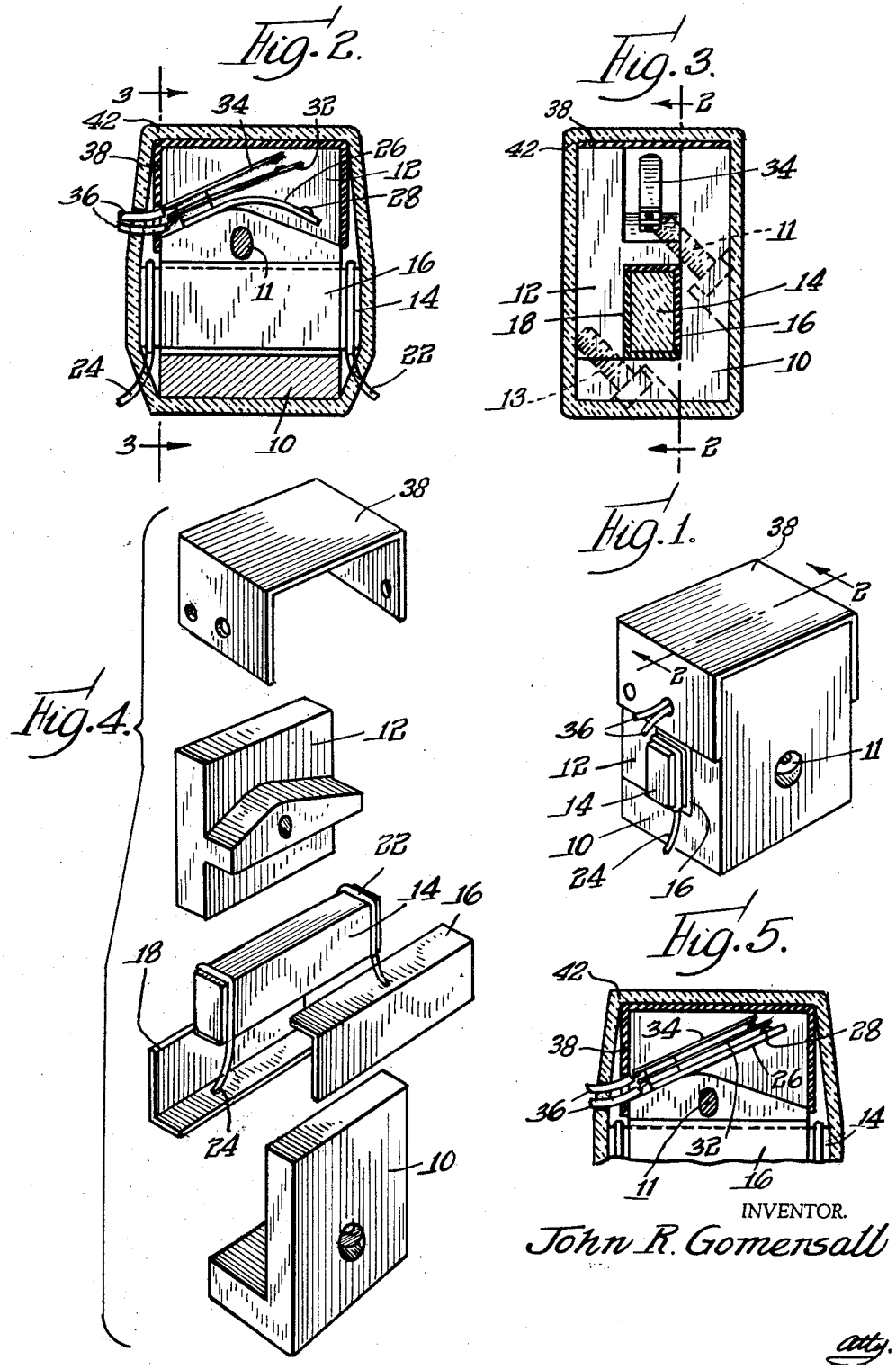

INVENTOR.
John R. Gomersall
atty.

United States Patent Office 3,070,678
Patented Dec. 25, 1962

3,070,678
THERMAL TIMER
John R. Gomersall, Elgin, Ill., assignor to McGraw-Edison Company, Elgin, Ill., a corporation of Delaware
Filed July 24, 1959, Ser. No. 829,322
5 Claims. (Cl. 200—122)

The present invention relates to thermal timers.

A commonly-used type of thermal timer includes a strip of thermostatic bimetal and an electric heater for it operating at a constant rate of heat input. Electric power may be applied to the heater during the timing period for heating the bimetal, and the bimetal, when it has deflected to a pre-selected position in response to temperature rise, actuates a control device such as an electric switch. Typically, the maximum reliable operating time for such a device having a bimetal strip an inch or two long, is a few minutes.

At the start of such a timing operation the temperature of the device rises at a rate determined by the rate of heat input and the thermal capacity (heat-absorbing capacity) of the device. As the temperature of the device rises above the temperature of its surroundings, the device loses heat to its surroundings. This loss reduces the rate at which heat goes into storage and consequently reduces the rate of temperature rise. As the temperature continues to rise the loss of heat increases correspondingly and the rate-of-temperature-rise gets smaller and smaller. As operation is continued, an equilibrium temperature is approached at which the heat loss balances the heat input. High reliability of the timing function is obtained by having the bimetal perform the control function while the temperature is still changing rapidly, that is, considerably before the temperature reaches its equilibrium value. The device operates similarly on cooling with similar timing characteristics.

One shortcoming of such a device is that the rate of change of temperature is highest at the beginning and continually slows down during the timing operation. The accuracy of the timing function is limited by the low rate of temperature change at the end of the operation, whereas the length of the interval that can be measured is severely limited by the high rate at the beginning.

In accordance with the present invention I supply heat to a thermal timer at a controlled rate that constantly varies with the temperature of the device for thereby adjusting the input to the changing rates of heat loss, all for providing a better pattern of temperature change, preferably a low rate at the beginning of the operation and a high rate at the end. For a given accuracy of time measurement, such operation provides a time-control interval at least three times as long as does operation at constant heat input as in prior devices. Preferably I employ a heater with a high negative-temperature coefficient of resistance, energized from a constant-voltage source. Such a heater may be constructed of carbon, silicon carbide, alumina or similar materials. The heater itself responds to the temperature of the device for regulating the rate of power input.

The thermal timer of my invention is sensitive to changes of heating voltage and consequently variation of the supply voltage provides a convenient method of changing the time setting. Furthermore, on temperature-decreasing operation, when the input voltage is reduced for shortening the time interval, the operation can approach a condition of constant-heat input and consequently provide a wide range of time variation.

Objects of the invention include the provision of a low cost, simple, compact, thermal timer of small mass and small power consumption capable of operating reliably and accurately for measuring long time periods. These and other objects will appear from the following description of one embodiment of the invention, taken in connection with the accompanying drawing wherein:

FIGURE 1 is a perspective view of a complete thermal timer embodying my invention;

FIG. 2 is a sectional elevation taken substantially along the plane indicated as 2—2 in FIGS. 1 and 3;

FIG. 3 is a sectional elevation taken substantially along the line 3—3 in FIG. 2;

FIG. 4 is an exploded perspective view of some of the parts of the device of FIGS. 1 to 3;

FIG. 5 is a partial view similar to FIG. 2 showing the device in a different operated position.

Figure 6:
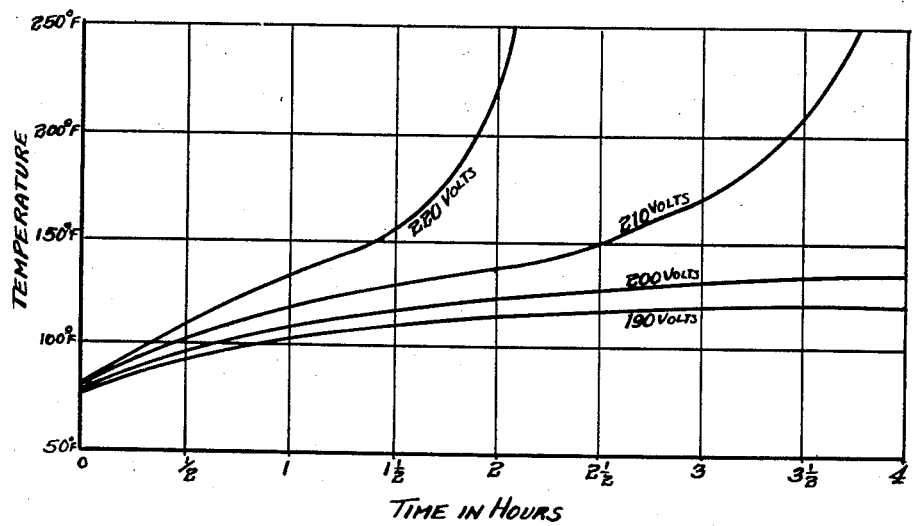
FIGS. 6 and 7 are graphs depicting certain operations of a device embodying my invention.

The device shown in FIGS. 1 to 5 includes two body members 10 and 12 of thermally-conducting material such as steel, arranged to be held together by screws 11 and 13 for clamping and partly enclosing a heating element 14 and a pair of electric insulating sheets 16 and 18. The clamping arrangement insures good thermal conductivity between the heating element and the two body members 10 and 12. The heating element 14 consists of a block of refractory material having a negative temperature coefficient of electric resistance, such as carbon, alumina or silicon carbide. Metal wires 22 and 24 affixed to the resistor block 14 serve as electric terminals and lie outside the clamp provided by the body members 10 and 12.

Mounted on the body member 12 and in good thermal contact therewith is a bimetal strip 26 arranged to bend from a cold curved position as shown in FIG. 2, to a hot, approximately straight position as shown in FIG. 5. In the position of FIG. 5, an insulating button 28 carried by the bimetal, engages a spring switch blade 32 for moving it toward a second blade 34 and closing a circuit between them. Insulated wires 36 provide connections to said switch blades for controlling a circuit.

As may be seen best in FIG. 3, the upper portions of body members 10 and 12 partially enclose the bimetal 26 and switch 32—34. An electric insulating sheet 38 lies over the top of the members 10 and 12, and a metal cover 42 completes the enclosure. A wrapping of asbestos cord provides thermal insulation.

The device of FIGS. 1 to 5 is a thermal timer and may be used in any known manner. Typically, an electric current is applied to the heating element 14 and heat is generated therein. Initially this heat causes a temperature rise of the heating element itself and of the rest of the structure, particularly the body members 10 and 12. As the temperature of the device rises it begins to lose heat to the surroundings and the rate of such loss increases with the difference of temperature between the timer and its surroundings. If the rate of heat generation in the heating element 14 is high enough, the temperature will in time become high enough that the switch 32—34 will be closed for causing operation of apparatus connected to the circuit wires 36. The device is capable of performing a timing function because time elapses while the device is heating up to the temperature at which switch 32—34 will close.

The rate of motion of bimetal 28 is substantially proportional to the rate of temperature rise of the device, which is substantially proportional to the rate at which stored heat accumulates in the device, and that in turn is the excess of the rate of heat generation in element 14 over the rate of heat loss from the device to its surroundings. Since the rate of loss increases with temperature, if the rate of heat generation is constant, as in prior devices, the rate at which heat accumulates and therefore the rate of temperature rise will decrease as the temperature rises.

Maximum precision, or complete accuracy of operation, would be achieved if, for example, the device closed the switch 32—34 after the same interval of energization of heater 14, every time it was so energized. The time interval is affected by the voltage applied to the heater, and by environmental temperature, and accordingly that voltage and temperature are controlled. For example, they may be held substantially constant. Of course it is economically impractical in a low-priced timer to hold these things precisely constant, and it then becomes necessary to control other conditions for minimizing the consequent impairment of accuracy. Uncontrolled variations of supply voltage and ambient temperature affect, respectively, the rate of heat input and the rate of heat loss. Since the difference between those two rates affects the rate of temperature rise and thereby affects the measured time-interval, accuracy is improved by keeping that difference as large as possible compared to the two rates themselves. This relationship lies behind the empirical rule of the prior art devices, that the best accuracy is obtained by terminating the operation while the temperature is still changing rapidly.

One desirable mode of operation would consist in keeping the heat input a constant percentage above the heat loss, as for example 10%. The rate at which heat then would accumulate in the device for raising its temperature would be 10% of the loss rate. Since the loss increases as the temperature rises, this mode of operation would cause the rate of temperature rise to increase with temperature, so that the temperature plotted against time would describe part of a parabola. Actually a device operating strictly according to that mode appears incapable of getting started because it requires zero heat input at the beginning. So a practical device would need a higher initial heat input than called for by the parabolic mode.

Figure 7:
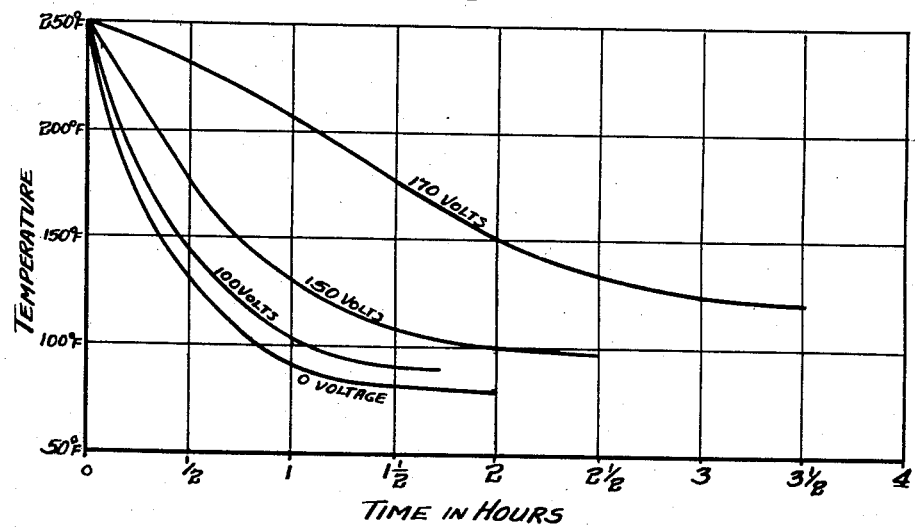

While such a nearly-parabolic curve represents good operation, much of the advantage of my invention can be realized with a device whose operation only approximates it. Thus in FIG. 6 the 220 volt and 210 volt curves show such approximations in that they show a low rate of temperature rise at the beginning and a high rate at the end. In the curves of FIGS. 6 and 7 the rate of temperature change at any instant is proportional to the slope of the curve at the point representing that instant. The steepest part of the curve shows the greatest rate of temperature change.

A further advantage of the high rate of temperature change at the end of the operation results from the requirement that the device do mechanical work to perform a control function at the end of the measured time interval. For example, work is required even to operate electric contacts. In order for contacts to carry substantial current they cannot just touch; they must be pushed against each other with some force. Because of the resilience in the system as, for example, the resilience of bimetal 26 itself, as well as that of the contact springs 32 and 34, some work is required for developing that force. Finally, because the value of the required force is, in any practical device, somewhat erratic, the necessity for developing that force introduces an element of uncertainty into the operation. Because the temperature rises rapidly at this end point of the operation, the timing irregularities due to mechanical loads, including the necessity for operating contacts, are kept small. I cause the heat to be generated in heating element 14, not at a constant rate as in prior devices, but rather at a rate that increases with temperature, and preferably at a rate that increases sharply at the end of the operation.

In order to automatically increase the rate of heat generation as the temperature of the timing device rises, I preferably make the heater 14 of a material having a large negative temperature-coefficient of resistance and energize it from a substantially constant-potential electric supply. As the temperature rises, the electric resistance of heater 14 decreases (conductivity increases) so that the electric current and rate of heat generation increase. For example, heating element 14 may be constructed of carbon, alumina or silicon carbide.

FIG. 6 shows time and temperature curves depicting operation on rising temperature of one actual device constructed according to my invention. FIG. 7 shows similar curves for operation on decreasing temperature. Each curve depicts operation with a constant voltage applied to the negative-temperature-coefficient heating element. As a basis for comparison with prior art devices, one constant-heat-input curve is included. This is the zero-voltage curve in FIG. 7. At zero voltage the heat input was constant at zero. Except for its inversion, this curve is substantially the same as would be obtained from a constant heat input with rising temperature. For many purposes the maximum usable time interval at constant heat input would be taken as one hour for the device whose performance is depicted by the curves of FIGS. 6 and 7. In contrast, much greater usable time intervals are shown by the other curves, where the rate of heat input increased with temperature. In particular the 210 volt curve in FIG. 6 shows excellent performance for timing intervals to 3½ hours. The 200 volt curve provides even longer times but with a lower rate of temperature rise.

As depicted in FIG. 7, a thermal timer can time by cooling even though some heat is supplied to it by its heater. If the heat is generated in the heating element at a rate less than the rate of loss of heat to the surroundings, the temperature of the device will fall. Here, as in the rising-temperature operation, if the heater generates heat at a constant rate, the temperature will change fast initially, but more slowly as the operation proceeds. Here again, my invention, by causing the heater to generate heat at a higher rate at high temperatures than at low temperatures, reduces the rate of temperature-change at the beginning of the operation for increasing the time during which the operation can run and still provide reliable timing. For example, the 170 volt curve of FIG. 7 shows excellent performance for timing periods of 2½ to 3 hours.

With my present invention I obtain reliable long operating times in a small low-cost device. I obtain this improved performance at no loss of flexibility in design because my device responds in much the same way as do prior devices to changes in such design parameters as the heat storage mass, the thermal insulation, and the voltage applied to the heating element. My invention also provides a similar, reliable, long, timing period on cooling if a low voltage is applied to its heater. And it has the further advantage that when the heater is deenergized entirely my device will cool in a fraction of its heat-up time.

My invention, though illustrated here by a specific embodiment, includes all modifications and variations within the scope of the appended claims.

I claim:

1. A thermal timer comprising, in combination, a heat storing body exposed to the atmosphere ambient of said timer whereby heat loss occurs between said body and said atmosphere with the rate of said heat loss increasing as said temperature of said body increases, temperature sensitive switch means adjacent to and controlled by the heat of said body, said switch means adapted to operate at a pre-set temperature of said body, and an electric resistor having a negative temperature coefficient of resistance supplying heat to said body whereby said increase in heat loss is compensated for by said electric resistor and said thermal timer has a wider range of control.

2. A thermal timer comprising, in combination, a heat storing body exposed to the atmosphere ambient whereby heat loss occurs between said body and said atmosphere with the rate of said heat loss increasing as the temperature of said body increases, a thermostat adjacent to and controlled by the heat of said body, said thermostat adapted to operate at a pre-set temperature of said body, and an electric resistor having a negative temperature coefficient of resistance and connected to a constant voltage source of electrical energy, said resistor supplying heat to said body whereby said increase in heat loss is compensated for by said electric resistor and said thermal timer has a wider range of control.

3. The combination of claim 2 wherein said resistor includes silicon carbide.

4. The combination of claim 2 wherein said resistor includes alumina.

5. The combination of claim 2 wherein said resistor includes carbon.

References Cited in the file of this patent

UNITED STATES PATENTS

| | | |
|---|---|---|
| 1,576,119 | Hall | Mar. 9, 1926 |
| 1,898,174 | Dubilier | Feb. 21, 1933 |
| 2,225,975 | Bruce | Dec. 24, 1940 |
| 2,248,623 | Hand | July 8, 1941 |
| 2,402,240 | Crise | June 18, 1946 |
| 2,706,229 | Buske | Apr. 12, 1955 |
| 2,758,175 | Hotchkiss | Aug. 7, 1956 |
| 2,763,815 | Wallace et al. | Sept. 18, 1956 |
| 2,790,060 | Pricer | Apr. 23, 1957 |
| 2,852,640 | De Lancey | Sept. 16, 1958 |